(12) United States Patent
Abeling et al.

(10) Patent No.: US 12,553,724 B2
(45) Date of Patent: Feb. 17, 2026

(54) METHOD AND DEVICE FOR CREATING A FIRST MAP

(71) Applicant: Robert Bosch GmbH, Stuttgart (DE)

(72) Inventors: Peter Christian Abeling, Hannover (DE); Ming Gao, Harsum (DE); Philipp Rasp, Reusten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 582 days.

(21) Appl. No.: 17/606,679

(22) PCT Filed: Apr. 2, 2020

(86) PCT No.: PCT/EP2020/059356
§ 371 (c)(1),
(2) Date: Oct. 26, 2021

(87) PCT Pub. No.: WO2020/224878
PCT Pub. Date: Nov. 12, 2020

(65) Prior Publication Data
US 2022/0205792 A1    Jun. 30, 2022

(30) Foreign Application Priority Data

May 3, 2019 (DE) ..................... 10 2019 206 336.5

(51) Int. Cl.
*G01C 21/32* (2006.01)
*G01C 21/00* (2006.01)
*G01C 21/36* (2006.01)

(52) U.S. Cl.
CPC ......... *G01C 21/32* (2013.01); *G01C 21/3602* (2013.01); *G01C 21/3819* (2020.08); *G01C 21/3848* (2020.08); *G01C 21/3878* (2020.08)

(58) Field of Classification Search
None
See application file for complete search history.

(56) References Cited

U.S. PATENT DOCUMENTS

| | | |
|---|---|---|
| 6,178,377 B1 | 1/2001 | Ishihara et al. |
| 6,502,033 B1 | 12/2002 | Phuyal |
| | (Continued) | |

FOREIGN PATENT DOCUMENTS

| | | |
|---|---|---|
| CN | 109472975 A | 3/2019 |
| DE | 102013208521 A1 | 11/2014 |
| | (Continued) | |

OTHER PUBLICATIONS

International Search Report for PCT/EP2020/059356, Issued Jul. 23, 2020.
SAE J3016 Surface Vehicle Recommended Practice, 2018, pp. 1-35.

*Primary Examiner* — Vivek D Koppikar
*Assistant Examiner* — David Ruben Pedersen
(74) *Attorney, Agent, or Firm* — NORTON ROSE FULBRIGHT US LLP

(57) ABSTRACT

A method for creating a first map. The method includes providing a second map, the second map including at least one predefined path; receiving map data, the map data representing at least one trajectory and at least one further object; and creating the first map starting from the map data, an alignment based on a superimposition of the at least one predefined path and the at least one trajectory being carried out, and subsequently a displacement of the at least one further object being carried out starting from the alignment. A device for carrying out the method for creating a first map is also described.

5 Claims, 2 Drawing Sheets

(56) References Cited

U.S. PATENT DOCUMENTS

| | | | |
|---|---|---|---|
| 6,687,611 B1 | 2/2004 | Hessing et al. | |
| 2008/0262721 A1 | 10/2008 | Guo et al. | |
| 2015/0308839 A1 | 10/2015 | Jiang et al. | |
| 2017/0082454 A1* | 3/2017 | Jurk | G01C 21/20 |
| 2020/0098135 A1* | 3/2020 | Ganjineh | G06F 16/583 |
| 2020/0103236 A1* | 4/2020 | Adams | G01C 21/3841 |

FOREIGN PATENT DOCUMENTS

| | | |
|---|---|---|
| DE | 102015225472 A1 | 6/2017 |
| DE | 102017208509 A1 | 11/2018 |
| DE | 102017210798 A1 | 12/2018 |
| EP | 0932134 A1 | 7/1999 |
| EP | 3136128 A1 | 3/2017 |
| JP | 2019049810 A | 3/2019 |

* cited by examiner

METHOD AND DEVICE FOR CREATING A FIRST MAP

The present invention relates, among other things, to a method for creating a first map including a step of providing a second map, a step of receiving map data, and a step of creating the first map, starting from the map data, with the aid of the second map.

SUMMARY

The method according to an example embodiment of the present invention for creating a first map includes a step of providing a second map, the second map including at least one predefined path, a step of receiving map data, the map data representing at least one trajectory and at least one further object, and a step of creating the first map starting from the map data, an alignment based on a superimposition of the at least one predefined path and on the at least one trajectory being carried out, and subsequently a displacement of the at least one further object, starting from the alignment, being carried out.

"A first map" and/or "a second map" is, for example, to be understood to mean a digital map that is present in the form of (map) data values on a memory medium. This map is designed, for example, in such a way that one or multiple map layers are encompassed, one map layer showing a map from the bird's eye perspective (courses and positions of streets, buildings, landscape features, etc.), for example. This corresponds to a map of a navigation system, for example. Another map layer includes, for example, a radar map, the surroundings features, which are displayed by the radar map, being stored together with a radar signature. Another map layer includes, for example, a LIDAR map, the surroundings features, which are displayed by the LIDAR map, being stored together with a LIDAR point cloud and/or LIDAR objects. Another map layer encompasses, for example, a video map, the surroundings features, which are displayed by the video map, being stored together with objects recognizable by a video sensor.

In one specific embodiment of the present invention, "a first map" and/or "a second map" is/are, for example, additionally or alternatively to be understood to mean a map that is suitable for operating a vehicle in an automated manner. "Operating a vehicle in an automated manner" is understood to mean that the vehicle is operated in a semi, highly or fully automated manner, according to one of SAE Levels 1 through 5 (see SAE J3016 Standard). In this case, operating the vehicle with the aid of the map includes, for example, determining a trajectory for the vehicle and/or driving along this trajectory with the aid of an automated transversal and/or longitudinal control and/or executing safety-relevant driving functions, etc.

"Providing the second map" is, for example, to be understood to mean that this second map is (down)loaded in the form of data values from a memory medium or an external source, so that it may be used to carry out the method.

"A predefined path" is, for example, to be understood to mean a featured line inside or along one of the driving lanes encompassed in the second map. In one specific embodiment, the second map includes, for example, a road having multiple lanes, each driving lane having a distinct course as well as a distinct expansion (for example in the form of a constant and/or varying width). Here, the predefined path corresponds to a line that runs in the center (i.e., a constant or similar distance from the left and the right boundaries of the driving lane) in the direction of this driving lane. In one specific embodiment, "a predefined path" is, for example, to be understood to mean a concatenation of points that are predefined at featured places along the path or inside or outside of the driving lane in a locally precise manner. In one specific embodiment, "a predefined path" is, for example, to be understood to mean a geometric line that is predefined at featured places along the path inside or outside of the driving lane in a locally precise manner.

"Map data" are, for example, to be understood to mean data that represent at least one trajectory and at least one further object. In this case, these data are provided by at least one vehicle that travels along this trajectory and has simultaneously detected the at least one further object with the aid of surroundings sensors encompassed by the vehicle.

In one specific embodiment of the present invention, the vehicle travels along the trajectory, for example, this trajectory being simultaneously detected and stored—for example as GPS positions in GNSS coordinates—with the aid of a localization device. The vehicle further encompasses its surroundings with the aid of surroundings sensors. "Surroundings sensors" are to be understood to mean at least one video and/or at least one radar and/or at least one LIDAR and/or at least one ultrasonic and/or at least one further sensor which is/are designed to detect the surroundings of the vehicle in the form of surroundings data values.

"Surroundings of the vehicle" are, for example, to be understood to mean at least one area that may be detected with the aid of the surroundings sensors of the vehicle. "Surroundings" may also be understood to mean a road section and/or larger areas (districts, regions, etc.). "The at least one further object" is, for example, to be understood to mean a structure (building, tunnel, bridge, etc.) and/or a traffic sign (traffic lights, signboards, etc.) and/or an infrastructure device (guardrail, roadway marking, etc.) and/or a landscape feature (mountain, lake, river, forest, etc.) and/or further surroundings features.

The at least one further object is detected and stored in the vehicle as map data together with a position that is determined as a function of vectors starting from the position of the vehicle, for example, with the aid of a distance and/or a direction of the at least one further object in relation to the vehicle.

"Receiving the map data" is, for example to be understood to mean that these map data are received with the aid of a transceiver unit directly from the vehicle, which provides these map data, or from a further processing unit, which has received the map data in advance directly or indirectly from the vehicle. In one specific embodiment, the map data are received in advance and loaded for carrying out the method, for example from a memory medium.

With the aid of the method according to the present invention, the object of improving the reliability and precision of map data is advantageously achieved. This is particularly important for the use of the first map for driving in an automated manner, since operating a vehicle more reliably and more safely may thus be ensured as a function of this first map. This is also particularly important for the acceptance of driving in an automated manner, since ensuring the safety of the occupants and of the vehicle may thus be increased. This object is achieved with the aid of an example embodiment of a method according to the present invention.

The at least one trajectory preferably represents an optimized trajectory that is ascertained in advance with the aid of a SLAM method starting from a plurality of trajectories.

"A plurality of trajectories" is, for example, understood to mean multiple trajectories of a plurality of driving operations, each trajectory referring to a comparable driving operation, for example to a specific driving lane of a traffic road along the same route segment. These individual trajectories are subsequently associated with one another with the aid of a SLAM (simultaneous localization and mapping) method and subsequently optimized together. This advantageously results in that the optimized trajectory is more precise than an individual trajectory. For example, erroneous information from individual trajectories may thus be avoided or reduced (for example with reference to individual position coordinates along these trajectories).

The map data preferably include two trajectories and the second map includes at least two predefined paths, the alignment being based on a superimposition of the at least two predefined paths and of the at least two trajectories, in particular each predefined path and each trajectory being assigned to one driving lane of a traffic road, in each case.

This showcases the advantage that the alignment may be determined more precisely and the quality or precision of the first map may thus be improved.

The device according to an example embodiment of the present invention, in particular a processing unit, is configured to carry out all steps of the method according to an example embodiment of the present invention.

In one specific embodiment of the present invention, the device includes a processing unit (processor, random access memory, hard drive) as well as a suitable software (computer program), in order to carry out the method according to the present invention. In one specific embodiment, the device includes a transceiver unit that is designed to exchange (map) data values, in particular with a vehicle and/or an external server or a cloud. In a further specific embodiment, the device is designed as a server or a cloud (i.e., a combination of servers or processing units).

A computer program is further provided, including commands that prompt the computer to carry out a method according to an example embodiment of the present invention, when the computer program is carried out by a computer.

Furthermore, a machine-readable memory medium is provided, on which the computer program is stored.

Advantageous refinements of the present invention are disclosed herein.

BRIEF DESCRIPTION OF THE DRAWINGS

Exemplary embodiments of the present invention are illustrated in the figures and explained in greater detail in the description below.

DETAILED DESCRIPTION OF EXAMPLE EMBODIMENTS

Figure 1:
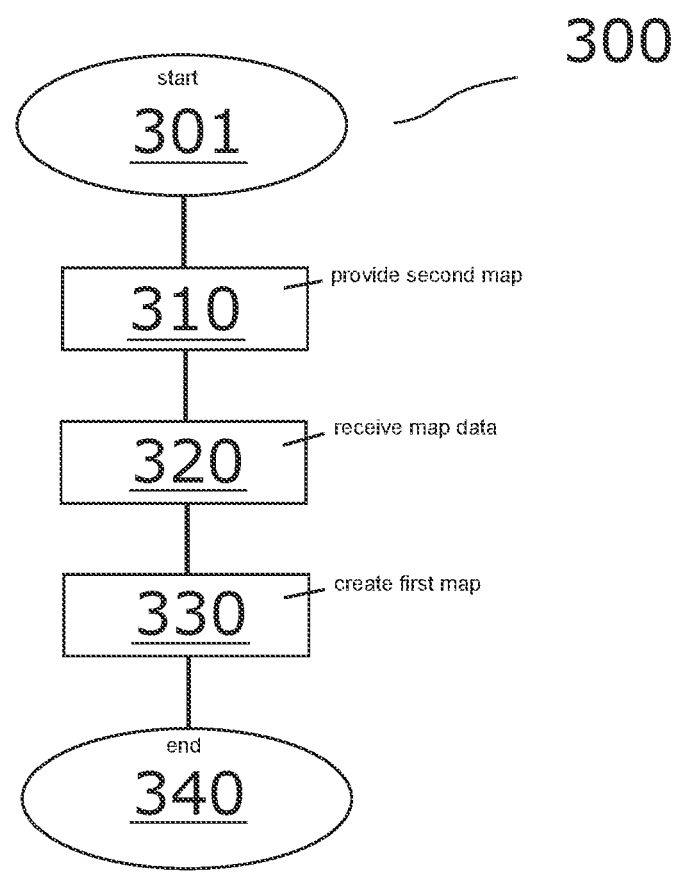
FIG. 1 shows one exemplary embodiment of the method according to the present invention in the form of a flowchart.

FIG. 1 shows one exemplary embodiment of method 300 according to the present invention in the form of a flowchart. It is elucidated in the following, among other things, how creating 330 of the first map, starting from the map data, takes place, for example.

Method 300 starts in step 301.

In step 310, a second map is provided, the second map encompassing at least one predefined path 100.

In one possible specific embodiment, the second map is a so-called planning map, for example, which contains semantic information about a road segment (connections between driving lanes, classification of the driving lanes, etc.). The first map is a so-called localization map, for example, which is designed in such a way that a vehicle may highly precisely localize itself with the aid of this map. "Highly precisely localize" is, for example, to be understood to mean a position determination in the GNSS coordinates that is precise up to few centimeters (maximally+/−10 cm). This has the advantage, for example, that—if the first and the second maps are aligned in relation to one another after carrying out method 300—it is simultaneously possible with the aid of both maps for the (automated) vehicle to be localized and the position within the planning map to be determined.

In step 320, map data are received, the map data representing at least one trajectory 200 and at least one further object. To make it possible for the first map to be created, at least one trajectory 200 is necessary that is received for this purpose, for example from a vehicle. In one possible specific embodiment, a plurality of trajectories 200 are received, for example, this plurality of trajectories 200 being traveled with the aid of a vehicle fleet, for example, stored and transferred—directly or indirectly—to the device according to the present invention for carrying out method 300 according to the present invention. Starting from the plurality of trajectories 200, an optimization of the plurality of trajectories 200, which results in an optimized trajectory being created, is subsequently carried out with the aid of a SLAM method in particular. In one possible specific embodiment, one optimized trajectory per driving lane of a traffic road is created, for example.

In step 330, the first map is created starting from the map data. In this case, an alignment is carried out that is based on a superimposition of at least one predefined path 100 and of at least one trajectory 200. Subsequently, a displacement of the at least one further object is carried out starting from the alignment. This is for example understood to mean an adaptation of the coordinates of the at least one further object with the aid of vector addition.

The alignment and the displacement are ultimately used to create the first map in such a way that it is aligned in relation to the second map. This alignment is carried out, for example, because the contents of the first and the second maps are to be combined. In a further specific embodiment, the alignment takes place because this makes it possible to correct potentially present erroneous partial data sets of the map data.

Method 300 ends in step 340.

Figure 2A:
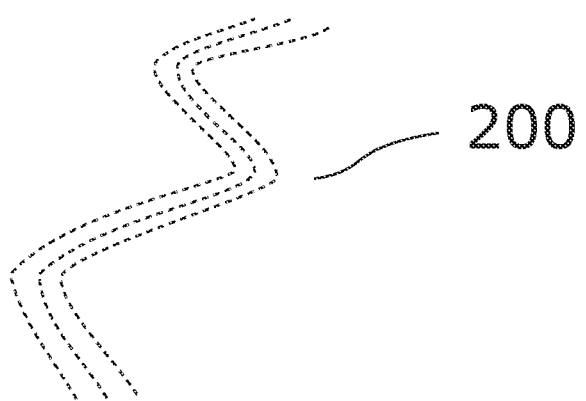
FIGS. 2A-2C show an exemplary embodiment of the method according to the present invention.
Figure 2B:
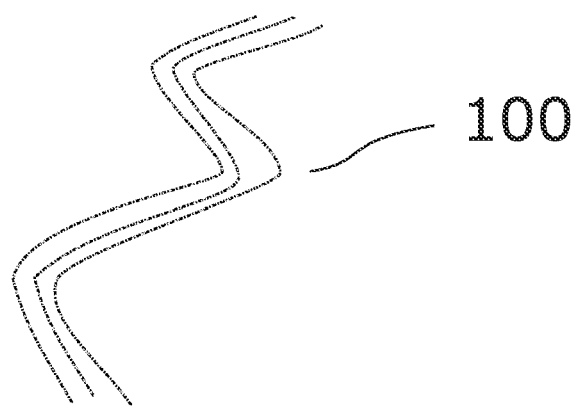
Figure 2C:
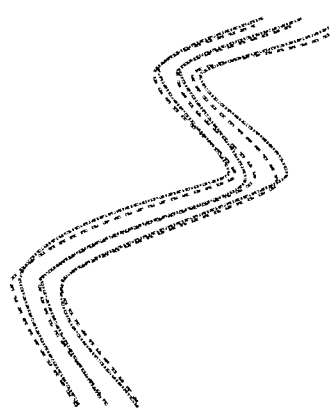

FIGS. 2A-2C show an example of the alignment of at least one (three in the present case by way of example) trajectory 200 (FIG. 2A) of at least one (also three in the present case by way of example) predefined path 100 (FIG. 2B). This takes place, for example, with the aid of a suitable algorithm or a suitable software (for example based on mathematical optimization processes) that optimally aligns at least one trajectory 200 to at least one predefined path 100 (FIG. 2C). This alignment is, for example, an approximation, since at least one trajectory 200 and at least one predefined path 100 are not exactly identical or do not have an exactly identical course. Starting from the alignment, the displacement may now take place, i.e., for example the adapting of the first map and of the second map to one another. In the following, both maps may now be used together, for example.

What is claimed is:

1. A method comprising:
obtaining a digital map that semantically labels a path of coordinates as a road;
obtaining sensor output of sensors of a plurality of vehicles, wherein the sensor output identifies respective trajectories traveled by the plurality of vehicles and one or more objects sensed as being present in surroundings of one or more of the plurality of vehicles during the traveling of the traveled trajectories;
determining a transformation of the identified trajectories by which the identified trajectories are aligned to the path of coordinates semantically labeled, in the digital map as the road, thereby displacing the one or more objects from a respective initially indicated position of the one or more objects to a respective digitally mapped position relative to the digital map; and
performing an autonomous drive of a vehicle according to the digitally mapped one or more objects.

2. The method as recited in claim 1, wherein the determining of the transformation includes combining the identified trajectories into an optimized trajectory using a simultaneous localization and mapping (SLAM) method that associated the identified trajectories with one another.

3. The method as recited in claim 1, wherein the digital map semantically labels multiple lanes of the road, the alignment being of different ones of the identified trajectories to different ones of the lanes.

4. A device comprising a processor configured to:
obtain a digital map that semantically labels a path of coordinates as a road;
obtain sensor output of sensors of a plurality of vehicles, wherein the sensor output identifies respective trajectories traveled by the plurality of vehicles and one or more objects sensed as being present in surroundings of one or more of the plurality of vehicles during the traveling of the traveled trajectories;
determine a transformation of the identified trajectories by which the identified trajectories are aligned to the path of coordinates semantically labeled, in the digital map as the road, thereby displacing the one or more objects from a respective initially indicated position of the one or more objects to a respective digitally mapped position relative to the digital map; and
perform an autonomous drive of a vehicle according to the digitally mapped one or more objects.

5. A non-transitory machine-readable memory medium on which is stored a computer program that, when executed by a computer, causes the computer to perform the following steps:
obtaining a digital map that semantically labels a path of coordinates as a road;
obtaining sensor output of sensors of a plurality of vehicles, wherein the sensor output identifies respective trajectories traveled by the plurality of vehicles and one or more objects sensed as being present in surroundings of one or more of the plurality of vehicles during the traveling of the traveled trajectories;
determining a transformation of the identified trajectories by which the identified trajectories are aligned to the path of coordinates semantically labeled, in the digital map as the road, thereby displacing the one or more objects from a respective initially indicated position of the one or more objects to a respective digitally mapped position relative to the digital map; and
performing an autonomous drive of a vehicle according to the digitally mapped one or more objects.

* * * * *